United States Patent [19]

Wristers

[11] 3,990,993

[45] Nov. 9, 1976

[54] NARROW PARTICLE SIZE DISTRIBUTION CATALYSTS AND METHOD THEREFOR

[75] Inventor: Harry J. Wristers, Baytown, Tex.

[73] Assignee: Exxon Research and Engineering Company, Linden, N.J.

[22] Filed: Nov. 13, 1974

[21] Appl. No.: 523,354

[52] U.S. Cl. .............................. 252/429 B; 526/1; 526/158; 526/250
[51] Int. Cl.² ........................................ B01J 31/02
[58] Field of Search ................ 252/428, 429 B, 430

[56] References Cited

UNITED STATES PATENTS

| | | | |
|---|---|---|---|
| 3,051,662 | 8/1962 | Pitzer et al. | 252/430 |
| 3,625,755 | 12/1971 | Potrafke | 252/428 |
| 3,838,064 | 9/1974 | Vogt et al. | 252/384 |
| 3,838,092 | 9/1974 | Vogt et al. | 260/33.6 F |
| 3,855,307 | 12/1974 | Rony et al. | 252/428 |

OTHER PUBLICATIONS

"Harshaw's Dustless Process," The Harshaw Chemical Co., Cleveland, Ohio.

*Primary Examiner*—Patrick P. Garvin
*Assistant Examiner*—John P. Sheehan
*Attorney, Agent, or Firm*—David A. Roth

[57] ABSTRACT

Particle size is increased and particle size range is decreased, e.g. narrower particle size distribution obtained of very tiny inorganic catalyst fines, (particles), particularly olefin catalysts by working these fines with very small quantities of polytetrafluoroethylene (PTFE) powder in order to trap the fines in a web of PTFE submicroscopic fibers.

6 Claims, No Drawings

NARROW PARTICLE SIZE DISTRIBUTION CATALYSTS AND METHOD THEREFOR

CROSS REFERENCE TO RELATED APPLICATIONS

This application is not formally related to any other application of the inventor.

BACKGROUND OF THE INVENTION

I. Problem to Which Invention is Directed.

Polymerization catalysts especially olefin polymerization catalysts (Ziegler) often have a wide particle size distribution (P.S.D.). It has been found that the catalyst particles provide "templates" for the formation of polymer particles; the catalyst particles themselves must be the same shape as the desired final polymer powder shape, desirably with a relatively narrow particle size distribution. Conventional high molecular weight polymer powders made with usual catalysts have a wide P.S.D. This property makes the resulting polymer powder very difficult to handle. A technique that narrows the P.S.D. of catalysts can narrow the P.S.D. of resulting polyolefins and consequently greatly increase their value by virtue of the improved economics of manufacture. Further in order to obtain larger powder particles, the catalyst particles themselves should possess a mean particle diameter of at least 10, preferably at least 20 (most preferably at least 35) microns.

II. Discussion of the Prior Art

The stereospecific polymerization of α-olefins such as propylene is well known in the art. Polypropylene resin has become a well-established plastic in the world market. Polypropylene powder sales are also increasing rapidly and, at the present time, are increasing more rapidly than sales of polypropylene pellets. The popularity of the polyproplene powder derives, at least in part, from the rapidly expanding use of filled grades of polypropylene, particularly glass- or talc-filled grades.

Most customers demand that polypropylene powder provide all of the resin quality normally obtainable in pelletized products and, in addition, that the powder possess the qualities of good flowability, low fines content, and no "clods" (large aggregates of particles). A reasonably high bulk density is also desirable.

The P.S.D. of catalysts can be made narrower by controlled growth of catalyst particles. Polyolefin P.S.D. can be made narrower by agglomeration and compaction of polymer particles. Adhesive binders have been used in this latter technique; however, adhesives do not function well in catalyst compaction since they poison the catalyst active sites. No prior art is known to the inventor that embodies the concept disclosed here for occluding catalyst fines. Although a Harshaw publication entitled "Harshaw's Dustless Process" describes a similar technique of eliminating dust from inert powders, Harshaw has no contemplation for using the process to obtain catalyst particle agglomerates of better P.S.D.

[1]Working directions have been liberally copied herein from that publication.

BRIEF SUMMARY OF THE INVENTION

In its most preferred aspect the invention involves working small quantities of PTFE powder with catalytic (preferably Ziegler catalysts, e.g. $TiCl_3$) fines, e.g. 10 microns in mean particle diameter or smaller which fines comprise 0.1 to 50% of a catalytic composition to result in a catalytically active particle more than 10 microns in mean particle diameter consisting of a plurality of catalytic fines in a web of submicroscopic fibers of PTFE.

DETAILED DESCRIPTION OF THE INVENTION WITH PREFERRED EMBODIMENTS

Prior to the present invention, it has not been practicable to meet the narrow particle size distribution objectives.

A catalyst having a narrow particle size distribution can be produced, but the product, especially from a ball milling step has many very tiny catalyst fines or particles, e.g. less than 1 micron up to 20 microns of mean particle diameter.

Such a catalyst product can be sieved to increase the mean particle diameter by separating the larger particles from the smaller, but since there is no utility for the discarded fines, this approach has not heretofore been attractive. The present invention allows the discarded fines to be used per se for producing larger particles. Or sieving can be eliminated and the larger and smaller particles together are worked to eliminate substantially all catalyst fines having a mean particle diameter of 10 microns or less.

The present invention provides a process whereby a Ziegler-type catalyst of larger particle size (e.g. 10 to 1,000, preferably 20 to 200 microns, most preferably 20 to 50 microns, average mean particle diameter) can be produced, which consists of particles having a relatively narrow particle size distribution.

The production of Ziegler-type catalysts from $TiCl_4$ can be accomplished with several reducing agents, each of which produces a reduced $TiCl_3 \cdot nAlCl_3$ catalyst. The value of $n$ varies with the reducing agent employed. When diethylaluminum chloride (DEAC) is used as the reducing agent, $n$ will range from about 0.15 to about 0.50, and usually will be from 0.28 to 0.43, although theoretically $n$ could be 0.5. Use of ethyl aluminum dichloride (EADC) results in a value of $n$ from 0.3 to 1.0. The catalyst having a higher $AlCl_3$ content usually will have a lower catalyst activity (expressed as grams of polymer product per gram of catalyst employed). Use of an excess of reducing agent provides a catalyst of lower $AlCl_3$ content, but the particle size is smaller. But any suitable reduction technique now known to the art or subsequently discovered can be used, since the reduction step per se is not at the point of novelty.

It is understood that the concept disclosed in this patent application will apply to formulations of catalyst such as: $TiCl_3 \cdot \chi AlCl_3$ where $\chi$ ranges between 0.01–1.5; $TiCl_m \cdot \chi AlR_nCl_{3-n}$ where $\chi$ ranges between 0.01–1.5, m ranges between 2–3.5, and n ranges between 0.01.3, and R is an organic radical such as $CH_3$, $C_2H_5$, $C_3H_7$ etc., or other organic radical that normally is known and described by Mole and Jeffrey[1]; $MX'_m \cdot \chi M'R_nX'_{3-n}$ where M are metals of groups IIIB, IVB and VB of the periodic table, and M' are elements of groups IA, IIA and IIIA of the periodic table, X and X' are elements of groups VIA and VIIA of the periodic table, and $m$, $\chi$, and $n$ vary as described above.

T. Mole and E. A. Jeffrey, "Organoaluminum Compounds", Elsevier, (1972).

The PTFE of choice for this invention is obtained from E. I. DuPont de Nemours & Co., Wilmington, Del. 19898, as TEFLON K which is sold as a Particle Control Additive. It is a white powder Type 10 for use with the Ziegler-type catalysts, which are the preferred catalysts of this invention.

Very generally, the process used to obtain the enlarged catalytic particle consisting of catalyst fines in a TEFLON K web comprises adding the TEFLON K to the catalyst powder, mixing to form a homogeneous blend, and working this blend to form a fiber-web of TEFLON K having a particle size larger than 10 microns mean diameter and containing many catalyst fines having a diameter of less than 10 microns mean diameter.

For best results, TEFLON K, Type 10, should always be handled at or below room temperature (20° C) so as to avoid further agglomeration of the PTFE particles. It should be spread as evenly as possible over the catalyst to be treated, such as by sprinkling or by continuously adding the PTFE to a continuous plant process, thus avoiding the batch addition of the PTFE which increases the likelihood of further agglomeration of the PTFE.

A homogeneous mixture is necessary if the fiber-web is to pervade the entire mixture. Dry mixtures can be prepared with most mixers but it should be noted that violent mixing such as with Waring Blendors, hammermills, or intensifier bars seems to initiate fibrillation and this is essential if tumbling is the only other working step.

Working is the application of a compressive shear to the mixture of TEFLON K and the catalyst powder to be treated so that the fiber-web is developed within the mixture.

The working action applies a compressive shear to the mixture, but the terms troweling and smearing are also descriptive of that kind of action. In the laboratory, this can be done with a spatula, a mortar/pestle or a small ball mill. In the plant, mullers, ball mills, slow-turning mixers or blenders, screw conveyors, spray driers and many more devices will do some or all of the fibrillation.

The working action just described must also be a slow action. Another consideration is that the mixture should be low in water content so that moisture does not serve as a lubricant to interfere with the working action.

One of the most important considerations is an adequate working temperature. The fiber-web will not form below 20° C nor will it survive above 320° C. A common working temperature is 100° C but with many materials it can be lower as determined by experimentation.

Any specific material to be treated will seem to have a minimum working temperature below which no obvious fibrillation occurs. Above this temperature there seem to be useful combinations of working conditions, dosage of TEFLON K and temperature. Stated a bit differently, within limits, working is faster and more effective with higher temperatures,
higher dosages of TEFLON K, and
better working action.

Well worked mixtures with TEFLON K will show evidences of fibrillation such as an increased cohesiveness, an obvious change in texture, and material on a spatula will exhibit "whiskers" hanging over the edge. Incidently, these "whiskers" seem to be web fragments made visible only by their trapped dust.

The first stage of fiber development, fiber initiation, is the most difficult and occasionally requires a different working action. A brief treatment of the mix in a hammermill, Waring Blendor or most any high-speed, intense mixer does this fiber initiation, presumably by elongating the TEFLON particles by impact. This kind of pre-treatment is optional though generally helpful to most succeeding working steps, but it is frequently essential ahead of working by tumbling only.

The dosage of TEFLON K will be higher in laboratory work than it will be later in the plant. The method of treatment will be a matter of choice but it should generally follow the method of plant production if possible, i.e., wet or dry treatment, etc. Start out with a high dosage such as ½% or even 1% TEFLON K if this is the first trial. The dosages referred to are the weight percent of resin in the dry material being treated. Mix the powdered TEFLON K with the material in a Waring Blendor for a couple minutes. Stop the blender occasionally to get the powders down into the blades if necessary. Heat the mix to 100° C and work as above.

After the first trial, conditions should be altered to produce the product desired.

A small laboratory ball mill can be a convenient working device. Fill the mill about 75–85% full of balls and mixture to minimize the cascading of the balls. The mill and contents can be preheated and will hold the heat well, or heat lamps may be used. This device makes work with toxic products relatively safe and easy since the material will be enclosed in the mill while it is being worked.

Laboratory production serves to give experience with the process, provide an idea of the kind of product that can be produced and these preparations can be tested for usefulness. Further, it is possible to note temperature and dosage ranges which may be guides to initial plant production.

In addition to the previously mentioned equipment, spray dryers with either nozzles or spinning discs will do a good job of fibrillation. Additional working with a hot blending operation has proven beneficial to some treatments.

Extruders also can be effective working devices. Lodige blenders have done well also, but be aware that some large sizes have air pressurized bearings which levitate the mix by aeration so that it cannot be worked.

Since this process is somewhat equipment dependent, it is recommended to move rather quickly into plant scale equipment.

Plant scale production generally requires a lower dosage because the larger mass of material being handled adds to the compressive shear action. Since a higher dosage than necessary may lead to greater cohesion and reduced flowability, it is well to start with a half to a fourth of the laboratory dosage. Should the treatment produce a poorly flowing product, it may usually be blended with more product to give a desirable finished product.

It is sometimes desirable to prepare a concentrate of powder and TEFLON K at from, say, 4 to 10 times the optimum dosage, and then blend it off to the desired final concentration in one massive dilution or by a gradual dilution. This is referred to as a master blend technique.

Fibril initiation is easier at these higher concentrations of TEFLON K. This method of treatment also permits an easier fibrillation of some difficult materials by starting the fibrillation at these higher concentrations. This is also a means for initiating fibrillation with temperature and working speed being short of optimum.

Care must be exercised to stop the mechanical working of the master mix or concentrate before it becomes too fibrillated. If not, further blending may become quite difficult.

An interesting advantage of the master blend method is that the total working time can frequently be less than with the normal working procedure. Time can be saved since fiber initiation is much more rapid at the higher loading of TEFLON K in the master mix. Also, much less time is needed to blend to the final dilution than to have worked the whole charge from the start.

This master blend method also permits a flexibility in the use of working machinery by using the equipment with the best working action for the master mix and then using less efficient equipment for blending it off.

It is possible to change particles of TEFLON K particle control additive into fibers by passing a proper mixture through a region of turbulent gas flow. This has been accomplished by use of orifice plates, Venturi tubes, etc., and it has been done with various addition methods, including spraying a fine mist of diluted TEFLON K, Type 20 into the hot gas stream which was carrying the powder to be processed. Thd Melt-Blowing process of Exxon Research could be used for mixing.

The Invention is further illustrated by the following examples:

EXAMPLE 1

$TiCl_3 \cdot 0.33AlCl_3$ produced by the reduction of $TiCl_4$ with aluminum and then dry ballmilled was obtained from the Stauffer Chemical Company as $TiCl_3 \cdot AA$ or $TiCl_3 \cdot A$ and was ground or ballmilled in the presence of dry TEFLON K. During the ballmilling the catalyst surface area was increased with concomitant increase in catalyst activity, but the catalyst was not poisoned by the inert TEFLON K. The catalyst fines that normally lead to a wide P.S.D. are in this process, held by submicron strands of Teflon. The polymer made with these catalyst particles will also have a narrow P.S.D.

$TiCl_3 \cdot 0.33AlCl_3$ that has been ballmilled and otherwise treated to improve its activity and stereospecificity, e.g., ether/$TiCl_4$ treatments, was also ballmilled with dry TEFLON K to agglomerate the catalyst particles in a web of Teflon fibers. The results are summarized in TABLES I and II following at pages 11–13. It is also understood that materials other than Teflon or special formulations of polytetrafluoroethylene will serve to entrap the catalyst particles as disclosed here, as well as other polymeric materials that fibrillate on mechanical treatment as described above. Thus polymeric materials such as polyethylene, chlorinated Teflons and other polyolefins at elevated temperatures may form polymer webs.

It is furthermore clearly envisioned that polytetrafluoroethylene treated with other materials such as Lewis bases or Lewis acids can be used in the above described treatment, thereby accomplishing two or more objectives, agglomerating catalyst particles and activating the catalyst.

All above descriptions are thought to be unique in that they modify the nature of the catalyst, which in turn modifies the nature of the product made from such a catalyst.

TABLE I

CATALYSTS TREATED WITH TEFLON K (TYPE 10)

| Experiment No. | Catalyst Type | Teflon Wt % | Ballmilled, Minutes | Catalyst Appearance | | Size mm |
|---|---|---|---|---|---|---|
| | | | | Shape | Particle Size Distribution | |
| (4375-) | | | | | | |
| 28-0(Control) | $TiCl_3AA$ | — | — | Irregular | Wide | $1 \times 10^{-3}$ |
| 29-0(Control) | $TiCl_3A$ | — | — | Irregular | Wide | $1 \times 10^{-1}$ |
| 28-1A | $TiCl_3AA$ | 1 | 15 | Plates | Narrow | 5 |
| 28-1B | " | 0.125 | 15 | Powder | Wide | $1 \times 10^{-3}$ |
| 28-2B | " | 0.1 | Ground | Clumped | Medium | 2 |
| 28-2C | " | 0.01 | " | " | " | 2 |
| 29-1 | " | 2 | 15 | Plates | Narrow | 10 |
| 29-1B | " | 2 | 30 | " | " | 3 |
| 29-2 | " | 2 | 60 | Powder | Medium | 0.1 |
| 29-2B | " | 2 | 120 | " | Wide | <0.1 |
| 29-3 | " | 1 | 15 | Plates | Medium | 3 |
| 29-3B | " | 1 | 30 | Powder | " | 0.1 |
| 29-4 | " | 1 | 60 | Powder | Wide | <0.1 |
| 29-5 | " | 2 | 60 | " | " | 0.1 |
| 29-9 | $TiC_3A$ | 0.5 | 60 | Powder | Wide | <0.1 |
| 29-9B | " | 1.0 | 75 | " | " | 0.1 |
| 29-10 | " | 1.0 | 120 | " | " | <0.1 |
| 29-11 | " | 0.5 | 240 | " | " | |
| 32-1 | $TiCl_3*^{(d)}$ | 0.2 | 120 | Plates | Medium | 2 |
| 32-1B | $TiCl_3^{(d)}$ | | | | | |
| 32-2 | $STP^{(b)}$ | (d) | 0.2 | 240 | Powder | |
| 32-2 | 1.0 | 15 | Plates | Medium | 2–5 | |
| 32-3 | $STP^{(c)}$ | 1.0 | 15 | " | " | 2–5 |

| Experiment No. | Catalyst Type | Teflon Wt % | Ballmilled, Minutes | Catalyst Properties | | | |
|---|---|---|---|---|---|---|---|
| | | | | Settle in $C_7$, Seconds$^{(a)}$ | Efficiency, w/w | Wax % | $C_7$-Insol. % | Polymer +200 Mesh, Wt % |

(4375-)

TABLE I-continued

| | | | | | | | | |
|---|---|---|---|---|---|---|---|---|
| 28-0(Control) | TiCl₃AA | — | — | 180 | 41 | 2.0 | 94.3 | 12 |
| 29-0(Control) | TiCl₃A | — | — | | 30.4 | | 91.9 | |
| 28-1A | TiCl₃AA | 1 | 15 | 1 | | | | |
| 28-1B | " | 0.125 | 15 | 10 | 41 | 2.6 | 94.6 | 14 |
| 28-2B | " | 0.1 | Ground | 1 | | | | |
| 28-2C | " | 0.01 | " | 1 | | | | |
| 29-1 | " | 2 | 15 | 1 | | | | |
| 29-1B | " | 2 | 30 | 1 | | | | |
| 29-2 | " | 2 | 60 | 5 | | | | |
| 29-2B | " | 2 | 120 | 60 | | | | |
| 29-3 | " | 1 | 15 | 1 | | | | |
| 29-3B | " | 1 | 30 | 5 | | | | |
| 29-4 | " | 1 | 60 | >120 | | | | |
| 29-5 | " | 2 | 60 | 5 | 34 | 1.9 | 95.3 | 1.2 |
| 29-9 | TiCl₃A | 0.5 | 60 | | | | | |
| 29-9B | " | 1.0 | 75 | 5 | | | | |
| 29-10 | " | 1.0 | 120 | 120 | 31.9 | 5 | 92.1 | 7.5 |
| 29-11 | " | 0.5 | 240 | | | | | |
| 32-1 | TiCl₃*(d) | 0.2 | 120 | 5 | | | | |
| 32-1B | TiCL₃(d) | 0.2 | 240 | 5 | | | | |
| 32-2 | STP(c) | 1.0 | 15 | <5 | | | | |
| 32-3 | STP(c) | 1.0 | 15 | <5 | | | | |

(a)Time required for print to be readable through ¾" diameter vial at one-half level of liquid
(b)STP catalyst activated with 0.96 (n-C₅H₁₁)₂O and 2.2 TiCl₄
(c)STP catalyst activated with 0.83 (i-C₅H₁₁)₂O and 2.5 TiCl₄
(d)Experimental catalyst having extremely fine particle size (0.5 to 30 microns)

TABLE II

POLYPROPYLENE PARTICLE SIZE DISTRIBUTION

| Catalyst No. Identification | (1) 3915-73-9A TiCl₃AA | (1) 4375-28-0 TiCl₃AA | 4375-28-1B TiCl₃AAF.1 | 4375-29-5 TiCl₃AAF 2. | (2) 4375-29-10 TiCl₃AF.1 |
|---|---|---|---|---|---|
| Particle Size Distribution | | | | | |
| 20 mesh, wt % | 0.7 | 0.2 | 3.5 | 16.4 | 4.6 |
| 60 " | 18.9 | 30.4 | 42.0 | 65.9 | 44.5 |
| 100 " | 29.1 | 30.9 | 23.8 | 10.9 | 20.9 |
| 200 " | 30.5 | 26.7 | 16.8 | 5.5 | 22.4 |
| 325 " | 9.5 | 7.8 | 8.0 | 0.9 | 7.1 |
| +325 " | 11.1 | 4.0 | 5.9 | 0.4 | 0.5 |
| los " | 0.2 | 0.0 | 0.0 | 0.0 | 0.0 |

(1)Untreated commercial catalyst
(2)Catalyst not previously ballmilled
Note: Number = particles still on mesh It is to be noted that in the above TABLE I the catalyst described in Experiments Nos. 32-2 and 32-3 as STP is a special experimental catalyst which is essentially a TiCl₄ which has been reduced in a diluent with an aluminum alkyl chloride and subsequently treated with the indicated amount of ether, followed by a treatment with the indicated amount of TiCl₄. This catalyst is exceptionally active and it is highly advantageous to be able to form the relatively large active particles of the invention from the small micron size fines of this particular catalyst.

It can be seen from an examination of the data in these TABLES I and II that dramatic changes in the particle size of the catalyst and the polymer resulting therefrom can be accomplished without appreciable loss of catalyst efficiency.

Although the invention heretofore has been described with particular emphasis on Ziegler-type catalysts, it is hereby disclosed that the technique is also of exceptional utility in the field of heterogeneous catalysts. These catalysts are primarily used in the refining industry and for chemical and petrochemical conversions. Examples of their use are for the manufacture of formaldehyde, acrylonitrile, desulfurization, naptha reforming, conversion of automotive emissions to gaseous components meeting EPA standards and the like.

Very generally, heterogeneous catalysts are prepared utilizing one of three major process techniques. These are:
1. Precipitation or coprecipitation
2. Impregnation
3. Comixing or compounding In all of these processes, there is a precipitation of either the catalyst itself or the support, followed by activation of the support if it is a supported catalyst, followed by a drying step, a washing step and in some cases, a forming step, and lastly an activation step if necessary.

Catalysts of this nature can also be classified very broadly by their intended use. Major classifications of this nature are oxidation, hydrogenation and polymerization.

Heterogeneous catalysts are also further classified by the particular inert support or carrier which is employed. These can be alumina, silica, combinations of silica-alumina, molecular sieves, carbon-supported and unsupported.

Where the catalyst is prepared from an aqueous solution or slurry, TEFLON K, Type 20, which is sold as an aqueous suspensoid is the preferred particle control additive medium.

Very frequently, catalyst shape for heterogeneous catalysts can be classified as granules, beads or spheres, cylinders, hollow cylinders, or monolithic pieces (honeycombs).

The agglomerates formed from small catalyst fines by the process of the invention can often be used as a substitute for an additional forming step, since in several instances a suitable form is reached by the agglomeration of the fines utilizing the technique of this invention.

Thus, the novel agglomerated PTFE webs containing trapped catalyst particles are often of the requisite size and shape for final use. And therefore finishing steps normally used such as extrusion can be conveniently omitted.

Furthermore, although PTFE has a relatively high temperature tolerance for a plastic, e.g., in the 400° to 500° F. range, in the event higher temperatures are utilized, the PTFE web fibers themselves will carbonize and form an in situ carbon-supported catalyst of the requisite shape.

The invention described herein is particularly significant when very expensive catalyst materials such as rare earth metals, and elements such as platinum, paladium, rhodium and the like are employed. This is specifically illustrated by the use of the new automotive emission control catalysts utilized in the 1975 models. Here the catalyst is so expensive, that every effort must be made to utilize the minimum amount necessary to achieve a particular standard. The technique of the invention is an excellent means of doing just that.

What is claimed is:

1. A Ziegler $TiCl_3.nAlCl_3$ (where $n$ is from 0.15 to 1.0) catalyst composition having a mean particle diameter of from 10 to 1,000 microns consisting essentially of a web of polytetrafluoroethylene submicroscopic fibers entangled with a plurality of $TiCl_3.nAlCl_3$ catalyst fines of less than 10 microns from a ball-milling step creating a large number of unduly fine catalyst particles adhering thereto, wherein said catalyst fines have a mean particle diameter of from 1 to 20 microns, said composition having adequate flow properties.

2. A composition according to claim 1 wherein the mean particle diameter of said catalyst composition is from 20 to 1,000 microns.

3. A composition according to claim 1 wherein the mean particle diameter of said catalyst composition is from 20 to 50 microns.

4. The process of converting Ziegler $TiCl_3.nAlCl_3$ (where n is from 0.15 to 1.0) catalyst fines resulting from a ball-milling step which creates a large number of unduly fine catalyst particles of less than 10 microns comprising 0.1 to 50 wt. % of a total Ziegler catalyst composition to a total agglomerated catalyst composition of at least 10 micron mean particle diameter, which consists essentially of working a small portion of a polytetrafluoroethylene powder, capable of forming submicroscopic fibrous web upon working at a temperature above that necessary to achieve fibrillation with said catalyst composition containing said fines whereby said agglomerated catalyst composition has good flow properties and is at least 10 microns in mean particle diameter.

5. The method of claim 4 wherein said polytetrafluoroethylene powder is utilized as a dry powder.

6. The method of said claim 4 wherein said polytetrafluoroethylene powder is used as a aqueous suspensoid.

* * * * *